United States Patent
Ho et al.

(10) Patent No.: US 8,300,440 B2
(45) Date of Patent: Oct. 30, 2012

(54) AC-DC CONVERTER AND AC-DC CONVERSION METHOD

(75) Inventors: Wing Choi Ho, Kowloon (HK); Wai Pong Choi, Kowloon (HK); Shu Yuen Ron Hui, Shatin (HK)

(73) Assignee: ConvenientPower HK Ltd., Shatin, N.T. (HK)

( * ) Notice: Subject to any disclaimer, the term of this patent is extended or adjusted under 35 U.S.C. 154(b) by 381 days.

(21) Appl. No.: 12/631,582

(22) Filed: Dec. 4, 2009

(65) Prior Publication Data

US 2011/0134673 A1 Jun. 9, 2011

(51) Int. Cl.
*H02M 7/219* (2006.01)
*H02M 3/335* (2006.01)

(52) U.S. Cl. .................... 363/84; 363/21.06; 363/21.14; 363/89; 363/127

(58) Field of Classification Search ............... 363/21.01, 363/21.02, 21.04, 21.06, 21.12, 21.14, 25, 363/89, 127
See application file for complete search history.

(56) References Cited

U.S. PATENT DOCUMENTS

| | | | | |
|---|---|---|---|---|
| 5,615,097 A | * | 3/1997 | Cross | 363/84 |
| 5,956,245 A | * | 9/1999 | Rozman | 363/89 |
| 6,016,046 A | | 1/2000 | Kaite et al. | |
| 6,271,712 B1 | | 8/2001 | Ball | |
| 6,597,587 B1 | * | 7/2003 | Poon et al. | 363/21.06 |
| 6,671,193 B1 | * | 12/2003 | Pelkonen | 363/53 |
| 2002/0067624 A1 | * | 6/2002 | Nishiyama et al. | 363/21.01 |
| 2003/0133313 A1 | * | 7/2003 | Criscione | 363/21.06 |
| 2004/0109335 A1 | * | 6/2004 | Gan et al. | 363/127 |
| 2004/0136207 A1 | * | 7/2004 | Havanur | 363/21.06 |
| 2005/0035795 A1 | * | 2/2005 | Liu | 327/131 |
| 2006/0013021 A1 | * | 1/2006 | Aso | 363/21.09 |
| 2009/0021226 A1 | * | 1/2009 | Fujita | 323/234 |
| 2009/0097291 A1 | * | 4/2009 | Bormann | 363/126 |
| 2009/0261790 A1 | * | 10/2009 | Arduini | 363/21.06 |
| 2010/0014324 A1 | * | 1/2010 | Yang et al. | 363/21.06 |
| 2011/0026279 A1 | * | 2/2011 | Li et al. | 363/25 |

FOREIGN PATENT DOCUMENTS

| | | |
|---|---|---|
| CN | 1277750 A | 12/2000 |
| CN | 101202502 A | 6/2008 |
| JP | 7-7928 A | 1/1995 |
| JP | 2001-339945 A | 12/2001 |

OTHER PUBLICATIONS

Selders, Jr., R., "Synchronous Rectification in High-Performance Converter Design", *Power / Designer*, Issue No. 112, [online]. [archived Jun. 18, 2006]. Retrieved from the Internet: <URL: http://web.archive.org/web/20060618104002/http://www.national.com/appinfo/power/files/national_power_designer112.pdf>, (2006), 8 pgs.

PCT International Search Report and Written Opinion, PCT Application No. PCT/IB2010/002393, Jan. 20, 2011, 10 pages.

* cited by examiner

*Primary Examiner* — Adolf Berhane
*Assistant Examiner* — Fred E Finch, III
(74) *Attorney, Agent, or Firm* — Fenwick & West LLP

(57) ABSTRACT

The present invention provides an AC-DC converter and AC-DC conversion method for converting an AC input provided by a power transfer winding. The AC-DC converter includes a rectifying means for rectifying the AC input into a rectified output, and a control means for controlling the rectifying means based on a comparison between a reference signal and a voltage feedback signal, the voltage feedback signal being based on the rectified output.

72 Claims, 10 Drawing Sheets

US 8,300,440 B2

AC-DC CONVERTER AND AC-DC CONVERSION METHOD

FIELD OF THE INVENTION

The present invention relates to AC-DC converters and AC-DC conversion methods. The invention will be described in the context of wireless power transfer, particularly where a power transfer coil functions as an energy-receiving coil that wirelessly receives energy in order to, for example, charge a battery included with a portable electronic device. However, it will be appreciated that the invention is not limited to this particular use.

BACKGROUND OF THE INVENTION

Traditional AC-DC power switching power supplies consist of an AC-DC power conversion stage and a DC-DC power conversion for output voltage regulation. Their output filter usually consists of an inductor and a capacitor forming an output voltage filter. The schematic of a traditional AC-DC converter with electric isolation can be shown in FIG. 1. It consists of two stages: an AC-DC power stage and a DC-DC power conversion stage.

For electrically isolated output voltage, which is required in many power supplies, electrical isolation is usually achieved with the use of an isolation transformer. The DC-DC power converter usually consists of an inverter bridge (fed by a DC voltage from a front AC-DC power stage), an isolation transformer, a rectifier and an output filter comprising an inductor and a capacitor. Generally, voltage feedback from the "secondary side" of the transformer is required and the control action for the output voltage regulation is carried out by the inverter on the "primary side" of the transformer. It is important to note that this traditional approach requires the output filter $L_{out}$ and $C_{out}$ to filter the switching voltage ripple.

In order to reduce the conduction loss in the diode rectifier, synchronous rectification can be used. Synchronous rectification has been utilized in switched mode power supply technology. The replacement of diodes with power MOSFETs with low on-state resistance enables synchronous rectifiers to have less conduction loss than diodes. This has been adopted in switched mode power supply for computer products which have Central Processing Units (CPUs) running at low voltage and high current conduction (e.g. 3.3 V DC at 100 A). In conventional switched mode power supply applications, closed-loop output voltage control is an essential feature because the output voltage of a power supply must be controlled within a tight tolerance.

In existing synchronous rectification technology, the output voltage regulation is primarily controlled from the primary side of the system. FIG. 2 shows a typical schematic of a DC-DC power converter using a synchronous rectifier based on National Semiconductor design document titled "Synchronous Rectification in High-Performance Power Converter Design" authored by Robert Selders Jr., and available at the website: http://www.national.com/appinfo/power/files/national_power_designer112.pdf.

In this traditional DC-DC converter with an isolated diode-based rectifier, the output voltage is controlled by the driving circuit on the primary side. Secondary feedback, via isolated means, is used to control the switching action in the primary circuit in order to regulate the output DC voltage.

The diodes in FIG. 2 can be replaced with power MOSFETs having low on-state resistance as shown in FIG. 3. Similar to the circuit in FIG. 2, the output voltage control is carried on the primary circuit with secondary feedback provided through isolated means. In addition, an output inductor $L_{out}$ is needed.

In principle, the secondary gate controller can be eliminated if a self-driven gate drive design is adopted. A self-driven synchronous rectifier takes advantage of the polarities of the induced voltages in the secondary winding. Such a self-driven synchronous rectifier is shown in FIG. 4 and a corresponding control scheme is shown in FIG. 5. Despite the fact that the secondary gate drives can be eliminated, the output voltage regulation is still controlled by the primary circuit.

In both cases, the synchronous rectifiers, regardless of using diodes or MOSFETs, provide the AC-DC rectification only. The output voltage regulation is controlled by the switching action in the primary circuit.

The problems of the traditional approach when employed in a wireless transfer system are summarized as follows:

(a) Two power stages, i.e. AC-DC and DC-DC without transformer isolation, are needed. This increases the cost and size of the circuit and is not attractive for embedding into a portable device such as a mobile phone, particularly, one with a slim design.

(b) Output voltage regulation is controlled by the inverter switching action on the "primary side" of the isolation transformer. This means an isolated feedback mechanism is required, which leads to increased cost.

(c) An output inductor $L_{out}$ is needed. This increases power loss and reduces energy efficiency of the secondary circuit, leading to: thermal problems in a portable device, which typically has no ventilation; safety problems in the battery due to a high temperature rise; and a reduction in overall system efficiency.

If output voltage regulation is needed without control from the primary circuit of the transformer, one solution is to use a DC-DC converter with voltage control as shown in FIG. 6. The AC voltage induced in the secondary winding is first rectified, and then the DC-DC converter will turn the rectified voltage into a regulated DC voltage. However, this approach:

(a) is a 2-stage method;

(b) requires a DC-DC converter, such as the ones described above; and (c) requires an output inductor.

These three factors increase the cost and size of the secondary module and reduce the overall energy efficiency of the system.

It is an object of the present invention to overcome or ameliorate at least one of the disadvantages of the prior art, or to provide a useful alternative.

SUMMARY OF THE INVENTION

The present invention provides in a first aspect an AC-DC converter for converting an AC input provided by a power transfer winding, the AC-DC converter including: a rectifying means for rectifying the AC input into a rectified output; and a control means for controlling the rectifying means based on a comparison between a reference signal and a voltage feedback signal, the voltage feedback signal being based on the rectified output.

Preferably, the rectifying means includes a synchronous rectifier. More preferably, the rectifying means includes a self-driven synchronous rectifier.

Preferably, the control means uses hysteresis control to control the rectifying means.

Preferably, the AC-DC converter includes a comparing means for providing the comparison to the control means, the comparing means comparing the voltage feedback signal with a hysteresis tolerance defined by an upper hysteresis band above the reference signal and a lower hysteresis band below the reference signal.

Preferably, the control means disables the rectified output when the voltage feedback signal exceeds the upper hysteresis band. Also preferably, the control means enables the rectified output when the voltage feedback signal falls below the lower hysteresis band.

Preferably, the AC-DC converter includes a main comparator for providing the comparison to the control means. Preferably, the main comparator has a non-inverting input and an inverting input, the voltage feedback signal being provided to the non-inverting input and the reference signal being provided to the inverting input. In one embodiment, the reference signal is a voltage across a zener diode.

Preferably, the AC-DC converter includes a voltage feedback means for sampling the rectified output and providing the voltage feedback signal. Preferably, the voltage feedback means includes a voltage feedback circuit connected to the rectified output. Preferably, the voltage feedback circuit is connected before an output capacitor. Preferably, the voltage feedback circuit includes a resistive potential divider.

Preferably, the rectifying means includes two main switches. Preferably, at least one main switch has low on-state resistance. Preferably, at least one main switch includes a power MOSFET. At least one main switch can include an N-type MOSFET or a P-type MOSFET or both. In some embodiments, at least one main switch includes a pair of component switches connected back-to-back to form a bi-directional switch.

Preferably, the control means includes a first driver for driving one main switch and a second driver for driving the other main switch, the first and second drivers disabling the rectified output when the voltage feedback signal is above the reference signal by a first predetermined value, and allowing the rectifying means to operate as a self-driven rectifier to enable the rectified output when the voltage feedback signal is below the reference signal by a second predetermined value.

Preferably, the first and second drivers disable the rectified output by maintaining both the main switches on. More preferably, the main switches form part of a closed loop circuit when both the main switches are on, the current of the AC input circulating in the closed loop circuit thereby disabling the rectified output. Preferably, the first and second drivers allow the rectifying means to operate as a self-driven rectifier by allowing the main switches to turn on and off as part of a self-driven rectifier.

In a first embodiment, each of the first and second drivers includes two driver switches.

Preferably, the control means includes a third driver for receiving the comparison between the reference signal and the voltage feedback signal, and for driving the first and second drivers based on the comparison. Preferably, the third driver includes two driver switches. Preferably, the first, second and third drivers drive the main switches through a summation point.

Preferably, the rectifying means receives the AC input via a reactive impedance formed from a leakage inductance from the power transfer winding in series with an input capacitor, the AC-DC converter including an impedance capacitor connected across the reactive impedance with an impedance capacitor switch, wherein the impedance capacitor switch is turned on when the main switches are on thereby connecting the impedance capacitor across the reactive impedance.

In a second embodiment, each of the first and second drivers includes three driver switches and a driver diode.

Preferably, each of the first and second drivers directly receives the comparison between the reference signal and the voltage feedback signal. Preferably, the control means includes an auxiliary low-power diode bridge having an auxiliary capacitor to provide DC power to the first and second drivers.

In a third embodiment, each of the first and second drivers includes two driver switches and two driver comparators. Preferably, one of the driver comparators operates as a logical OR gate.

Preferably, the control means includes a return switch in the return path of the AC input such that turning off the return switch when the rectified output is disabled reduces energy loss from continuously circulating current.

Preferably, the control means includes a third driver in the return path of the AC input, the third driver being self-biased such that the return switch is normally closed, and the third driver turning off the return switch when the rectified output is disabled thereby reducing energy loss from continuously circulating current. Preferably, the third driver includes three driver switches.

Preferably, the AC-DC converter forms part of a wireless power receiver that receives power wirelessly through the power transfer winding. Preferably, the wireless power receiver is a portable electronic device. Preferably, the power transfer winding is a transformer winding located on one side of a transformer and the control means is located on the same one side of the transformer. The control means is preferably conductively coupled to the rectifying means. Also preferably, the AC-DC converter is a single-stage AC-DC converter.

In a second aspect, the present invention provides a method of converting an AC input provided by a power transfer winding, the method including: rectifying the AC input into a rectified output; and controlling the rectification on the basis of a comparison between a reference signal and a voltage feedback signal, the voltage feedback signal being based on the rectified output.

Preferably, a synchronous rectifier is used to rectify the AC input into the rectified output. More preferably, a self-driven synchronous rectifier is used to rectify the AC input into the rectified output.

Preferably, hysteresis control is used to control the rectification.

Preferably, the method includes comparing the voltage feedback signal with a hysteresis tolerance defined by an upper hysteresis band above the reference signal and a lower hysteresis band below the reference signal.

Preferably, controlling the rectification includes disabling the rectified output when the voltage feedback signal exceeds the upper hysteresis band. Also preferably, controlling the rectification includes enabling the rectified output when the voltage feedback signal falls below the lower hysteresis band.

Preferably, a main comparator is used to compare the voltage feedback signal with the reference signal. Preferably, the main comparator is provided with a non-inverting input and an inverting input, and the method includes providing the voltage feedback signal to the non-inverting input and providing the reference signal to the inverting input. In one embodiment, a voltage across a zener diode is used to provide the reference signal.

Preferably, the method includes sampling the rectified output to provide the voltage feedback signal. Preferably, a voltage feedback circuit connected to the rectified output is used to sample the rectified output. Preferably, the voltage feedback circuit is connected before an output capacitor. Preferably, the voltage feedback circuit is provided with a resistive potential divider.

Preferably, two main switches are used to rectify the AC input into the rectified output. Preferably, at least one main switch is provided with low on-state resistance. Preferably, at least one main switch is provided with a power MOSFET. At least one main switch can be provided with an N-type MOSFET or a P-type MOSFET or both. In some embodiments, at least one main switch is provided with a pair of component switches connected back-to-back to form a bi-directional switch.

Preferably, controlling the rectification includes driving one main switch with a first driver and driving the other main switch with a second driver, the first and second drivers disabling the rectified output when the voltage feedback signal is above the reference signal by a first predetermined value, and allowing the main switches to operate as part of a self-driven rectifier to enable the rectified output when the voltage feedback signal is below the reference signal by a second predetermined value.

Preferably, the first and second drivers disable the rectified output by maintaining both the main switches on. More preferably, the main switches form part of a closed loop circuit when both the main switches are on, the current of the AC input circulating in the closed loop circuit thereby disabling the rectified output. Preferably, the first and second drivers allow the main switches to turn on and off to operate as part of a self-driven rectifier.

In a first embodiment, each of the first and second drivers is provided with two driver switches.

Preferably, controlling the rectification includes receiving the comparison between the reference signal and the voltage feedback signal with a third driver, and driving the first and second drivers with the third driver based on the comparison. Preferably, the third driver is provided with two driver switches. Preferably, the first, second and third drivers drive the main switches through a summation point.

Preferably, the AC input is provided via a reactive impedance formed from a leakage inductance from the power transfer winding in series with an input capacitor, the method including providing an impedance capacitor connected across the reactive impedance with an impedance capacitor switch, and turning on the impedance capacitor switch when the main switches are on thereby connecting the impedance capacitor across the reactive impedance.

In a second embodiment, each of the first and second drivers is provided with three driver switches and a driver diode.

Preferably, each of the first and second drivers directly receives the comparison between the reference signal and the voltage feedback signal. Preferably, the method includes providing an auxiliary low-power diode bridge having an auxiliary capacitor to provide DC power to the first and second drivers.

In a third embodiment, each of the first and second drivers is provided with two driver switches and two driver comparators. Preferably, one of the driver comparators operates as a logical OR gate.

Preferably, controlling the rectification includes providing a return switch in the return path of the AC input such that turning off the return switch when the rectified output is disabled reduces energy loss from continuously circulating current.

Preferably, controlling the rectification includes providing a third driver in the return path of the AC input, the third driver being self-biased such that the return switch is normally closed, and the third driver turning off the return switch when the rectified output is disabled thereby reducing energy loss from continuously circulating current. Preferably, the third driver is provided with three driver switches.

Preferably, the method includes receiving power wirelessly through the power transfer winding, wherein the power transfer winding is provided as part of a wireless power receiver. Preferably, the wireless power receiver is provided as a portable electronic device. Preferably, the power transfer winding is provided as a transformer winding located on one side of a transformer, and wherein the rectification is controlled with a control means located on the same one side of the transformer. Preferably, the AC input is rectified into the rectified output with a rectifying means and the rectification is controlled with a control means conductively coupled to the rectifying means. Also preferably, the AC input is converted into the rectified output in a single stage.

BRIEF DESCRIPTION OF THE FIGURES

Preferred embodiments in accordance with the best mode of the present invention will now be described, by way of example only, with reference to the accompanying figures, in which.

DETAILED DESCRIPTION OF THE BEST MODE OF THE INVENTION

Figure 1:
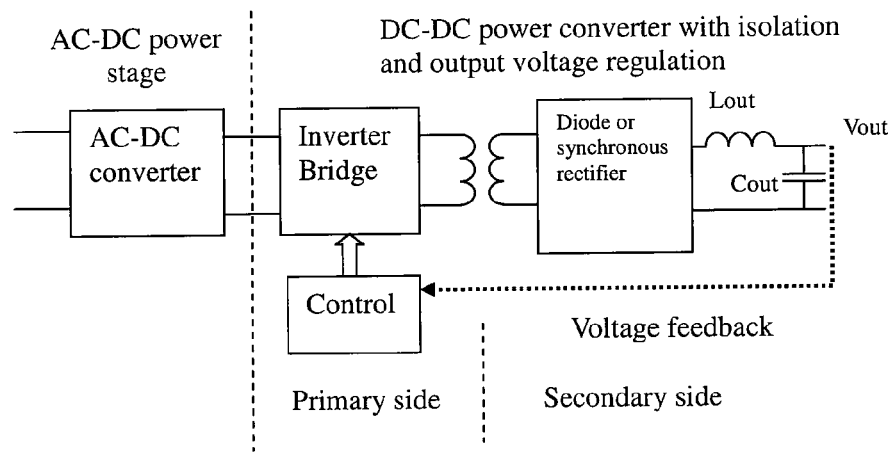
FIG. 1 is a schematic diagram of an AC-DC power converter with electrically isolated output voltage regulation.
Figure 2:
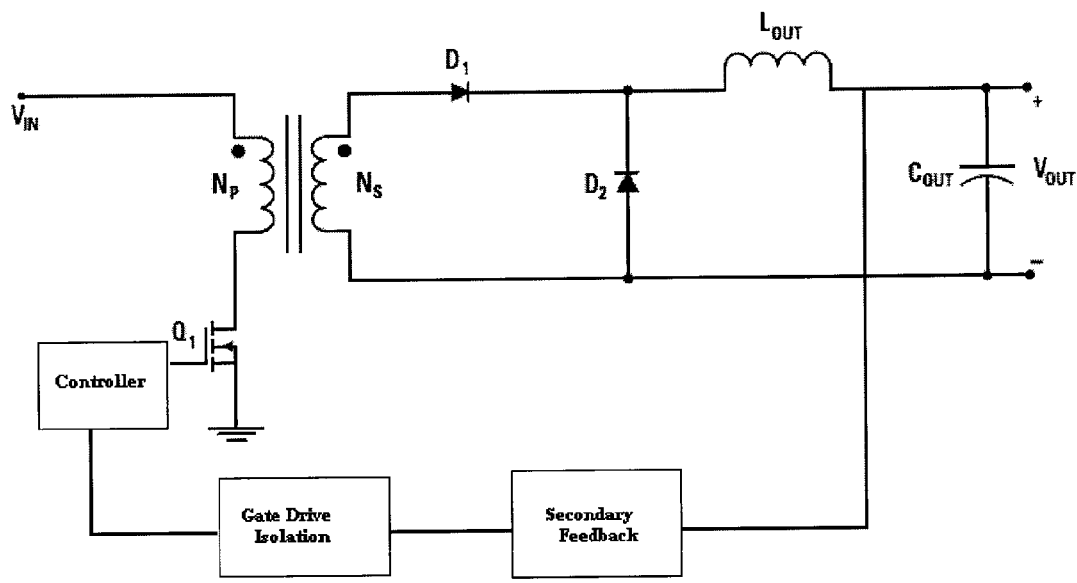
FIG. 2 is a schematic diagram of a DC-DC isolated power converter with diode-based synchronous output rectification.
Figure 3:
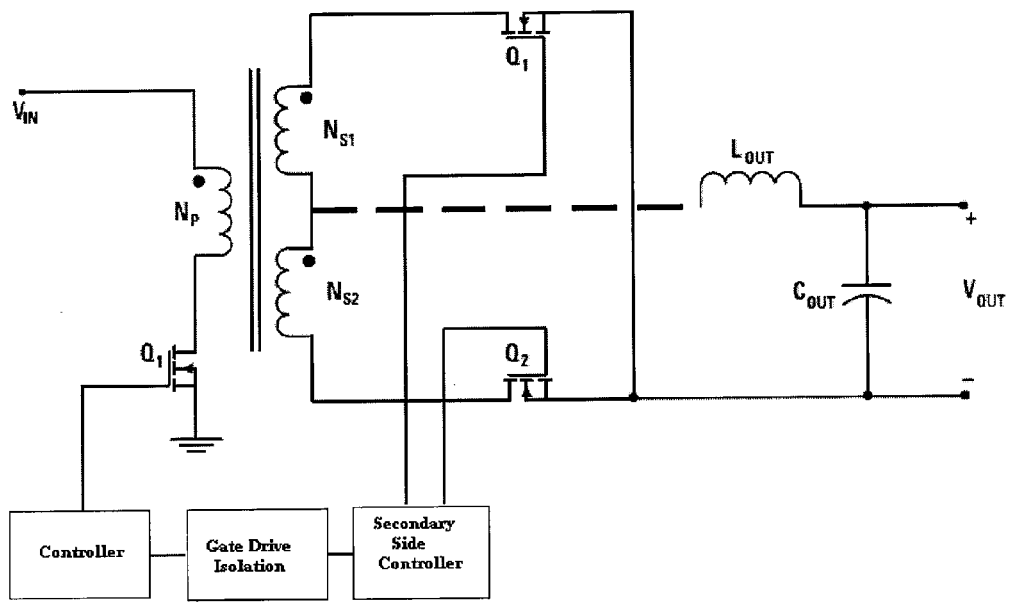
FIG. 3 is a schematic diagram of a DC-DC isolated power converter with MOSFET-based synchronous output rectification.
Figure 4:
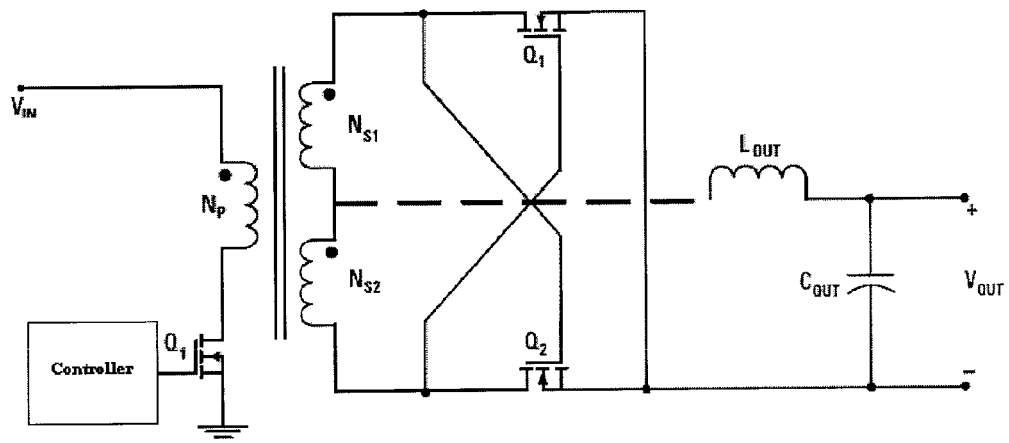
FIG. 4 is a schematic diagram of a DC-DC isolated power converter with self-driven MOSFET-based synchronous output rectification.
Figure 5:
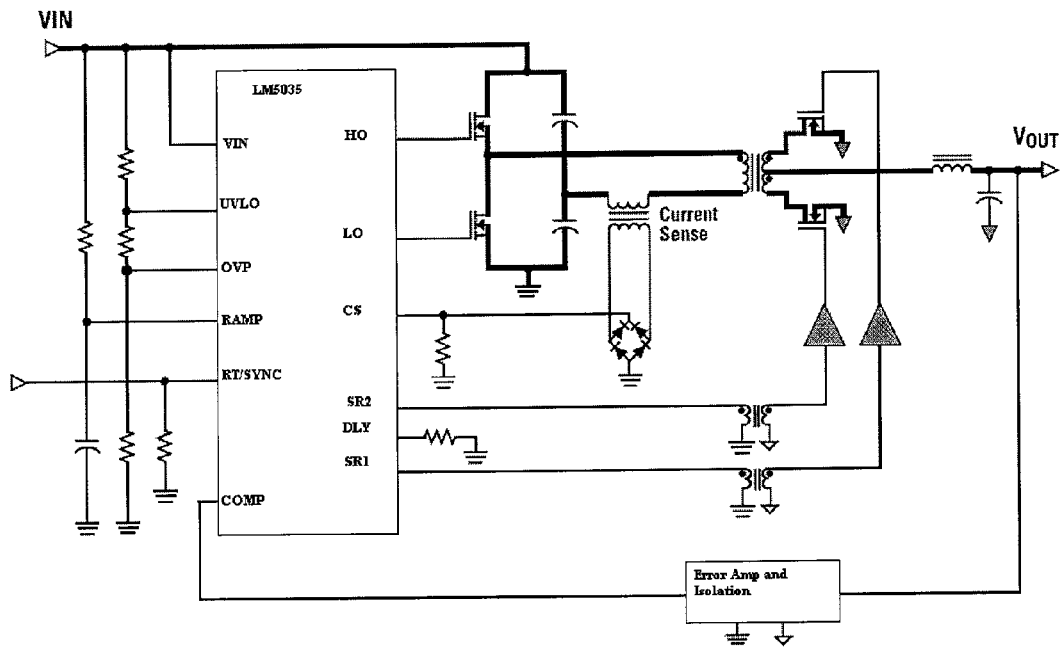
FIG. 5 is a schematic diagram of a control scheme of an isolated power converter with MOSFET-based synchronous output rectification.
Figure 6:
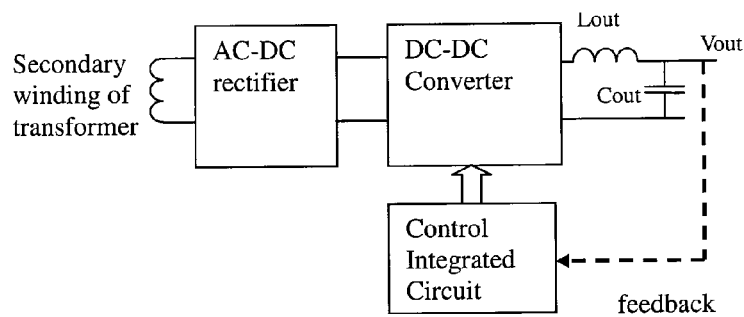
FIG. 6 is a schematic diagram of a secondary circuit with voltage control on the secondary side.

Referring to the figures, there is provided an AC-DC converter 1 for converting an AC input 2 provided by a power transfer winding 3. The AC-DC converter 1 includes a rectifying means 4 for rectifying the AC input 2 into a rectified output 5, and a control means 6 for controlling the rectifying means 4 based on a comparison between a reference signal 7 and a voltage feedback signal 8, the voltage feedback signal being based on the rectified output 5.

Thus, the AC input 2 is converted into the rectified output 5 in a single stage, the AC-DC converter 1 thereby being a single-stage AC-DC converter. Furthermore, the power transfer winding 3 is a transformer winding located on one side 9 of a transformer 10 and the control means 6 is located on the same one side 9 of the transformer 10. The control means 6 is conductively coupled to the rectifying means 4.

The rectifying means 4 includes a synchronous rectifier 11, which in the present embodiment, is a self-driven synchronous rectifier. The control means 6 uses hysteresis control to control the rectifying means 4. In particular, there is a comparing means 12 for providing the comparison to the control means 6, the comparing means 12 comparing the voltage feedback signal 8 with a hysteresis tolerance defined by an upper hysteresis band above the reference signal 7 and a lower hysteresis band below the reference signal 7. The control means 6 disables the rectified output 5 when the voltage feedback signal 8 exceeds the upper hysteresis band, and enables the rectified output 5 when the voltage feedback signal 8 falls below the lower hysteresis band.

In the present embodiment, the comparing means 12 is in the form of a main comparator 13. The main comparator 13 has a non-inverting input 14 and an inverting input 15, the voltage feedback signal 8 being provided to the non-inverting input and the reference signal 7 being provided to the inverting input. In this particular embodiment, the reference signal 7 is a voltage across a zener diode 16.

There is also a voltage feedback means 17 for sampling the rectified output 5 and providing the voltage feedback signal 8. In particular, the voltage feedback means 17 includes a voltage feedback circuit 18 connected to the rectified output 5. In the present embodiment, the voltage feedback circuit 18 is connected before an output capacitor 19, and includes a resistive potential divider 20.

The rectifying means 4 includes two main switches 21 and 22. The control means 6 includes a first driver 23 for driving one main switch 21 and a second driver 24 for driving the other main switch 22. The first and second drivers 23 and 24 disable the rectified output 5 when the voltage feedback signal 8 is above the reference signal 7 by a first predetermined value, and allow the rectifying means 4 to operate as a self-driven rectifier to enable the rectified output 5 when the voltage feedback signal 8 is below the reference signal 7 by a second predetermined value.

The first and second drivers 23 and 24 disable the rectified output 5 by maintaining both the main switches 21 and 22 in an on position. In particular, the main switches 21 and 22 form part of a closed loop circuit when both the main switches are on, the current of the AC input 2 circulating in the closed loop circuit thereby disabling the rectified output 5. The first and second drivers 23 and 24 allow the rectifying means 4 to operate as a self-driven rectifier by allowing the main switches 21 and 22 to turn on and off as part of a self-driven rectifier.

Thus, embodiments of the present invention relate to a novel concept together with relevant circuits and control schemes for electromagnetically coupled single-stage self-driven AC-DC converters with synchronous rectifiers that have output voltage regulation functionality without using an output inductor and without using a DC-DC converter.

More particularly, embodiments of the present invention involve band-band or hysteresis control of the output DC voltage for an electromagnetically coupled secondary circuit in which a synchronous rectifier included with an AC-DC converter of the invention should provide self-driven switching and output voltage regulation without using an output filter inductor. A basic embodiment is based on the embodiment described above, and uses the voltage feedback means 17, the comparing means 12, the desired voltage reference 7 in the secondary circuit to form the control means 6 to control the power flow of the rectifying means 4 to the output capacitor 19 in a manner that ensures that the output voltage is regulated to a desired DC voltage level within a certain tolerance.

Figure 7:
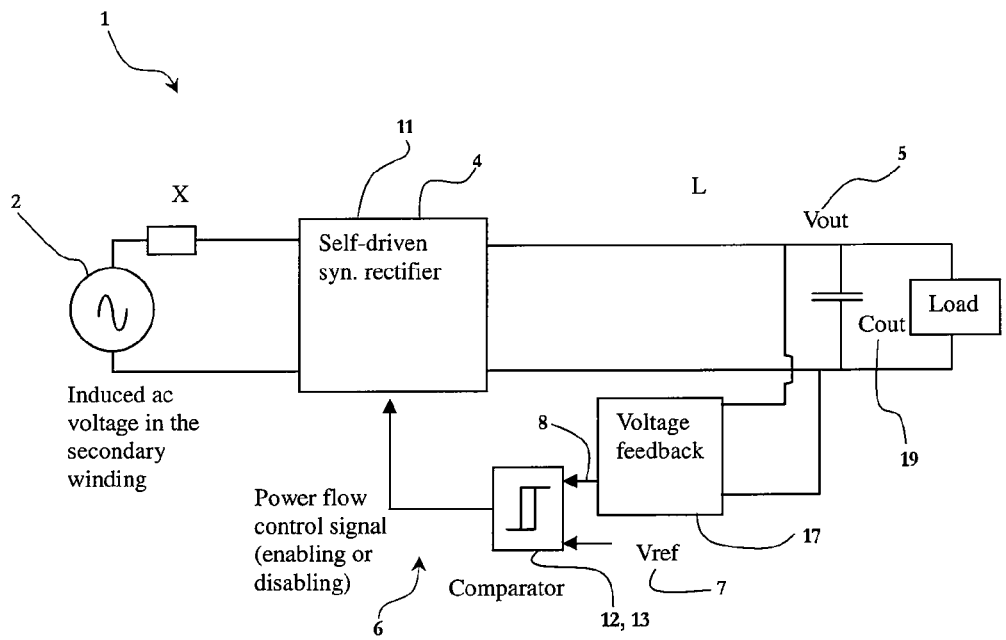
FIG. 7 is a schematic diagram of an AC-DC converter in accordance with an embodiment of the present invention, the AC-DC converter using hysteresis control for output voltage regulation without using primary circuit control.

FIG. 7 shows this basic embodiment. The power transfer winding 3 is in the form of a secondary winding of a magnetically coupled device, which in this embodiment, is the transformer 10. The secondary winding 3 is fed to the rectifying means 4, in the form of a synchronous rectifier circuit, through a reactive impedance X. The impedance X can consist of the stray or leakage inductance of the secondary winding 3 in series with an input capacitor 25 for impedance matching in order to achieve maximum power transfer and high efficiency.

As described above, a power flow enabling and disabling mechanism in the synchronous rectifier 4, controlled by the control means 6, regulates the output voltage. The synchronous rectifier 4 is on the one side 9, that is, the secondary side, of the transformer, which is the same one side 9 the control means is located on so as to control the synchronous rectifier 4 without control from the primary side 34 and also without an output inductor. Thus, the synchronous rectifier 4 and the control means 6 form part of the secondary circuit.

The voltage feedback circuit 18, in the form of the resistive potential divider 20, is used to provide the voltage feedback signal 8 for comparison with the reference signal 7. In this embodiment, the reference signal 7 is a voltage across a zener diode 16, but the signal can be obtained from other means in other embodiments. This reference voltage 7 is usually a scaled down version of the desired output voltage level $V_o$.

The main comparator 13 has a hysteresis tolerance with an upper hysteresis band and a lower hysteresis band. The difference between the upper band and the lower band is the tolerance $\Delta V$. If the voltage feedback signal 8 exceeds the reference voltage 7 level by $V_o+\Delta V/2$ (i.e reaching the upper band), the main comparator 13 will disable the power flow from the self-driven synchronous rectifier 4 to the output filter capacitor 19. The voltage of the output capacitor 19 is also the output voltage of the AC-DC converter 1. When the power flow is disabled, the output capacitor 19 will be discharged by the load and hence the output voltage $V_{out}$ will decrease.

When $V_{out}$ is decreased to the lower hysteresis band (i.e. $V_o-\Delta V/2$), the main comparator 13 will change state to enable the power flow and so the voltage of the output capacitor 19 will increase. This bang-bang control strategy allows this secondary circuit to self-regulate the output voltage without using control from the primary circuit of the transformer 10. The operation of this bang-bang or hysteresis control is illustrated with the aid of relevant waveforms of the secondary circuit in FIG. 8.

Embodiments can be applied to general AC-DC power conversion and are particularly suitable for use in the energy-receiving modules (secondary modules) of wireless energy transfer systems such as wireless battery charging systems for portable electronic device loads. If applied to wireless energy transfer through the use of loosely coupled transformers, the output voltage regulation is carried out by the rectifying means 4, such as the self-driven synchronous rectifier described above, and controlled by the control means 6, both on the secondary side 9 of the wireless energy transfer system.

This is the case in the present embodiment, in which the AC-DC converter 1 forms part of a wireless power receiver that receives power wirelessly through the power transfer winding 3. The wireless power receiver is a portable electronic device, such as a mobile phone or a laptop computer.

Thus, both the rectifying means 4 and the control means 6 are part of the secondary circuit or the energy-receiving module in the portable electronic device, that is, the secondary side 9 of the wireless energy transfer system, and the control means 6 controls the rectifying means 4 on the secondary side 9 without control from the primary circuit or wireless charging circuit, that is, the primary side 34 of the wireless energy transfer system. The wireless charging circuit can be part of for example, a wireless charging pad.

In future wireless energy transfer systems, such as those that include wireless battery charging pads, the secondary modules could be designed from different manufacturers based on some common protocol agreed to by an international body such as the International Wireless Power Consortium (http://www.wirelesspowerconsortium.com). This means that the primary circuit may not be designed exactly for a particular secondary load. In this case, it is necessary that output voltage regulation be provided by the secondary circuit. While the secondary winding will receive energy via the electromagnetic coupling, the secondary circuit also needs to regulate its output DC voltage in order to protect the remaining charging circuit and battery inside the portable electronic load, such as a mobile phone. Embodiments of the present invention provide new solutions to meet the output voltage regulation requirements of self-driven synchronous rectifiers on the secondary side of the system without direct control from the primary side.

Three particular embodiments of the present invention will now be described in further detail. The same numbering is used for the same or equivalent features in different embodiments, unless otherwise indicated.

Embodiment 1

Figure 9:
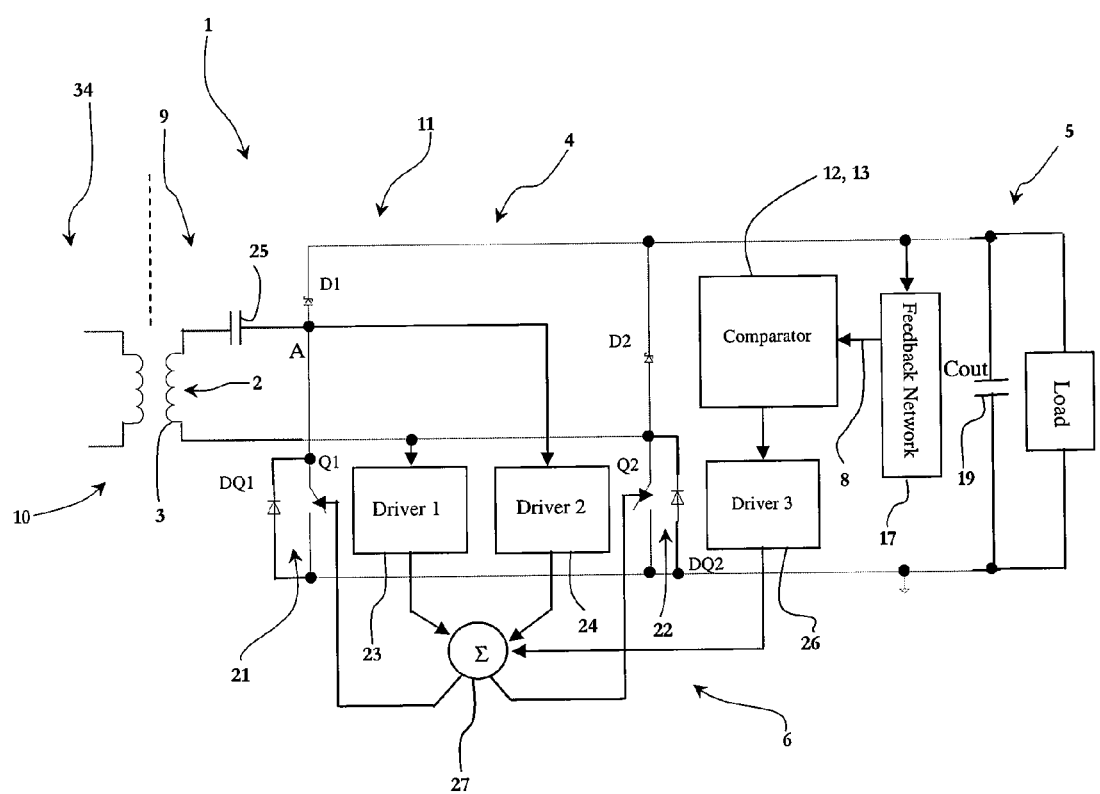
FIG. 9 is a schematic diagram of an AC-DC converter in accordance with another embodiment of the present invention.
Figure 10:
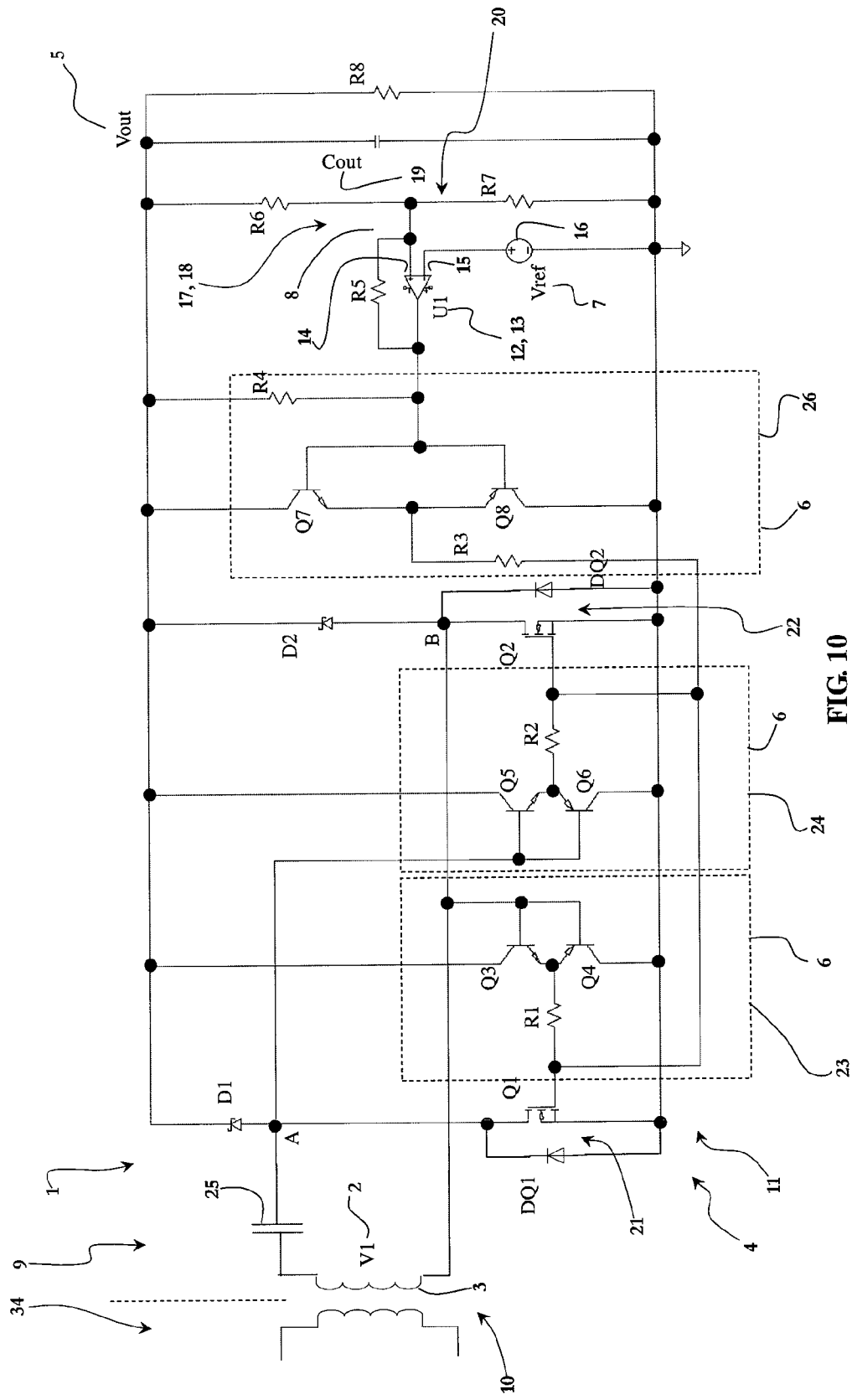
FIG. 10 is a schematic diagram showing the AC-DC converter of FIG. 9 in further detail.
Figure 11:
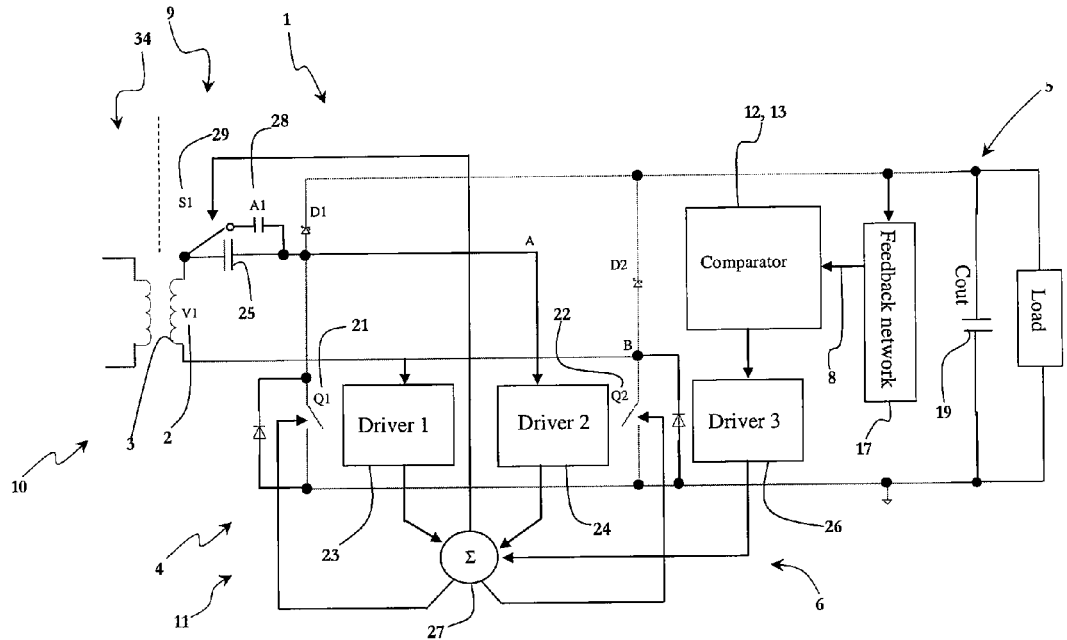
FIG. 11 is a schematic diagram of a modified version of the AC-DC converter of FIG. 9.

FIG. 9, FIG. 10 and FIG. 11 show a secondary AC-DC bridge-type rectifying circuit 4. An ordinary full-bridge comprising two diodes D1 and D2 and two main switches 21 (also labeled as "Q1" in FIGS. 9, 10 and 11) and 22 (also labeled as "Q2" in FIGS. 9, 10 and 11) (Q1 and Q2 can be N-type MOSFETs) is fed by an AC input 2 having a voltage V1 (which can be an induced voltage in the secondary winding of a transformer) through some input impedance (which can be stray inductance of the secondary winding or an inductive-capacitive impedance). The two main switches 21 (Q1) and 22 (Q2) are of a type with low on-state resistance (such as MOSFETs) and are intentionally utilized to replace two ordinary diodes at the lower portion of the bridge for the purpose of switching control and also for reducing conduction loss. The AC power delivered to the output load R8, with a filtering capacitor 19 ($C_{out}$) can be regulated to achieve a constant DC output 5 ($V_{out}$). It should be noted that even before this circuit becomes ready to function when the system is powered up, the diodes D1 and D2 and the body diodes of Q1 and Q2 already provide a diode rectifier. Therefore, the inherent diode rectifier function exists before the self-driven synchronous rectifier 4 is ready to function.

One simple control method for this self-driven synchronous rectifier 4 is to use a hysteresis control mechanism. A feedback circuit 18 formed by two resistors R6 and R7 is used to sense the output voltage and feed it into the non-inverting input of a main hysteresis comparator 13 (U1). The sampled voltage 8 is then compared with a predefined voltage reference 7 ($V_{ref}$) at the inverting input of the main comparator 13. This reference voltage 7 can be obtained from the stable voltage of a zener diode or other equivalent means. When the sampled voltage signal 8 is higher than the reference voltage 7 by a hysteresis voltage band (representing a certain small tolerance), the output of the main comparator 13 will go to "high". When the sampled voltage signal 8 is lower than the reference voltage 7 by a hysteresis voltage band, the output of the main comparator 13 will go to "low". That means when the output voltage is higher than desired value, the main comparator 13 goes to high and vice versa. The introduction of the small hysteresis band (tolerance) is to avoid unwanted chattering of the output of the main comparator 13 when the feedback voltage 8 is very close to the reference voltage 7.

There are three drivers in FIG. 9, FIG. 10 and FIG. 11. One driver 23 (also labeled as "Driver 1" in FIGS. 9, 10 and 11), formed by Q3 and Q4, is used to drive the main switch 21 (Q1) to turn ON or OFF according to the switching voltage sensed at point B. The other driver 24 (also labeled as "Driver 2" in FIGS. 9, 10 and 11), formed by Q5 and Q6, is used to drive the main switch 22 (Q2) to turn ON or OFF according to the switching voltage sensed at point A. Therefore, the drivers 23 and 24 are designed to form the self-driven gate drive system 6 that controls the synchronous rectifier 4 according to the AC voltage input 2 to the synchronous rectifier 4 so that the synchronous rectifier can replace the diode rectifier.

A third driver 26 (also labeled as "Driver 3" in FIGS. 9, 10 and 11) is designed for the control of the power flow from the synchronous rectifier 4 to the output capacitor 19. The gates of Q1 and Q2 are intentionally connected at a summation point 27 by three resistors R1, R2 and R3, to receive the driving signals from the three drivers 23, 24 and 26 at the same time. When the third driver 26, formed by Q7 and Q8, does not function in the circuit, the output of the third driver 26 through R3 will bias both Q1 and Q2 in the linear operation region at around 2 volts. The AC input switching signal at point A and point B will drive main switches Q1 and Q2. Therefore, the full-bridge D1, D2, Q1 and Q2 will function as a self-driven synchronous rectifier at the lower portion of the bridge circuit. Without the use of the third driver 26, the synchronous rectifier 4 does not have the output regulation capability.

Once the hysteresis control mechanism is in place, the bridge circuit can act as a self-regulated AC-DC converter. In particular, there are two modes: power flow disabling and power flow enabling. These modes are described in further detail below.

Figure 8:
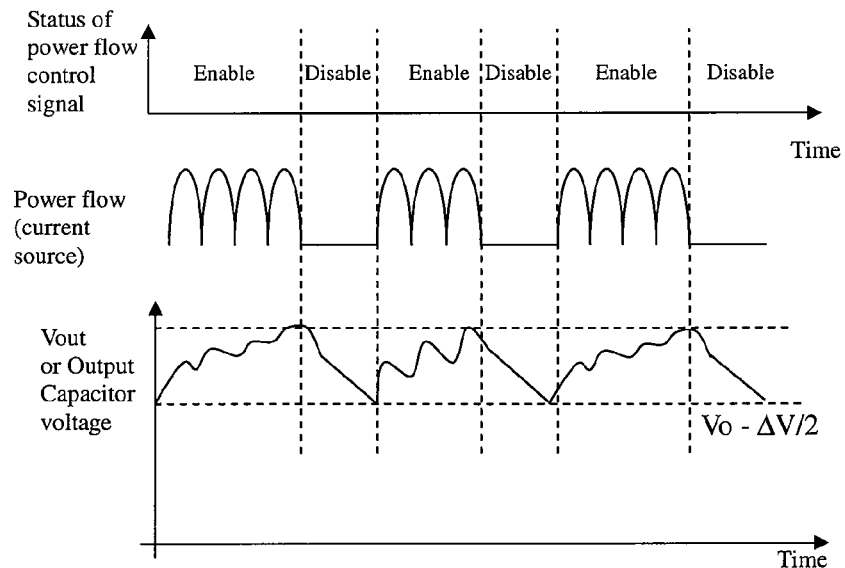
FIG. 8 is a series of graphs showing the performance of a bang-bang control scheme utilized by an AC-DC converter in accordance with an embodiment of the present invention.

Power Flow Disabling: When the feedback voltage signal 8 is higher than the desired value, the main comparator 13 (U1), goes to high. The high output of U1 drives Q7 of the third driver 26 to saturation (i.e. to fully turn on). The gate voltages of both main switches Q1 and Q2 go high and turn on both main switches completely at the lower portion of the bridge circuit. The input 2 (V1), input impedance, Q1 and Q2 will form a closed loop circuit. Input current will circulate in this loop (without being transferred to the output to charge up the output capacitor 19 and thus increase the output voltage 5) until the main switches Q1 and Q2 are turned off. When both Q1 and Q2 are turned on and the input current circulates within this loop, this is effectively the "disable" period in FIG. 8. Power flow is disabled from transferring to the output capacitor 19 in this "disable" period. During this power flow disabling period, the capacitor voltage will remain constant if there is no load discharging the output capacitor 19. If the output capacitor 19 is loaded, the output capacitor will be discharged by the load and so the output voltage will decrease as shown in FIG. 8. This situation will continue until the output voltage decreases to the lower hysteresis voltage band where the feedback voltage 8 becomes less than the reference voltage 7.

Power Flow Enabling: The input power can then be transferred to the output capacitor 19 again when the feedback voltage 8 is less than reference voltage 7. In this case, the output of the main comparator 13 (U1) becomes "low". The third driver 26 will not influence the normal self-driven functions of the other two drivers 23 and 24 and so the main switches Q1 and Q2 will turn on and off according to the normal self-driven mechanism described previously. During this power flow enabling period, the input current will charge the output capacitor 19 and the output voltage will increase until it reaches the upper hysteresis voltage band.

Since the hysteresis voltage band is small, the power flow disabling and enabling mechanism ensures that the output voltage 5 is regulated to the desired level within a tight tolerance. Since the power flow from the synchronous rectifier 4 is in form of a current source, the current source can be used to charge the capacitor 19 directly without using an extra output filter inductor. For wireless charging systems, this feature is acceptable because the voltage ripple in the output of the secondary module can be relatively large because there will be a battery charging control inside the battery pack for further control of the battery charging, such as control of the initial constant current charging and the subsequent constant voltage charging.

The power flow disabling (i.e. turning on both Q1 and Q2) and enabling mechanism is a main factor in the present invention to determine or regulate the amount of input power that will go to the output load. This control signal is derived from the output of the main comparator 13 (U1). Hysteresis control is one application example. Other control methods that can take advantage of this disabling and enabling mechanism can also be used. In the example shown in FIG. 9 and FIG. 10, the input current circulates within a loop and is prevented from transferring to the output to charge up the output capacitor 19.

It should be noted that the impedance X in FIG. 7 can consist of a leakage inductor and a series input capacitor 25 to form a series resonant circuit that is designed according to the operating frequency of the transformer. If the two main switches Q1 and Q2 are turned on together to form a closed current loop, there may exist a resonant situation that may lead to a high current in the loop. To avoid this high current issue, one solution is to modify the circuit to include an alternative path with a different capacitor such as an impedance capacitor 28 (also labeled as "A1" in FIG. 11). By inserting the impedance capacitor A1 across the impedance X using an impedance capacitor switch 29 (S1) when both of Q1 and Q2 are turned on, the resonant frequency of the equivalent impedance will change and limit the loop current to a lower value.

Embodiment 2

Figure 12:
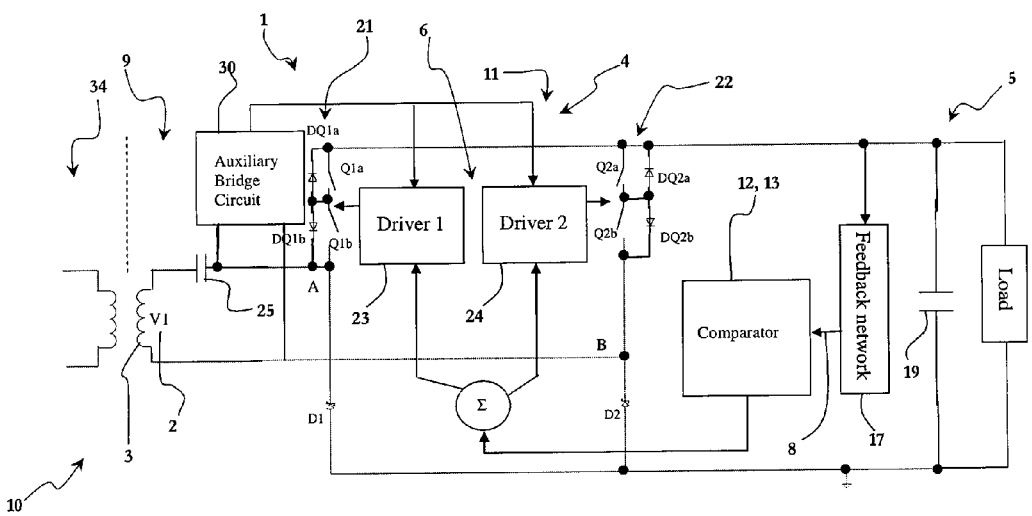
FIG. 12 is a schematic diagram of an AC-DC converter in accordance with yet another embodiment of the present invention.
Figure 13:
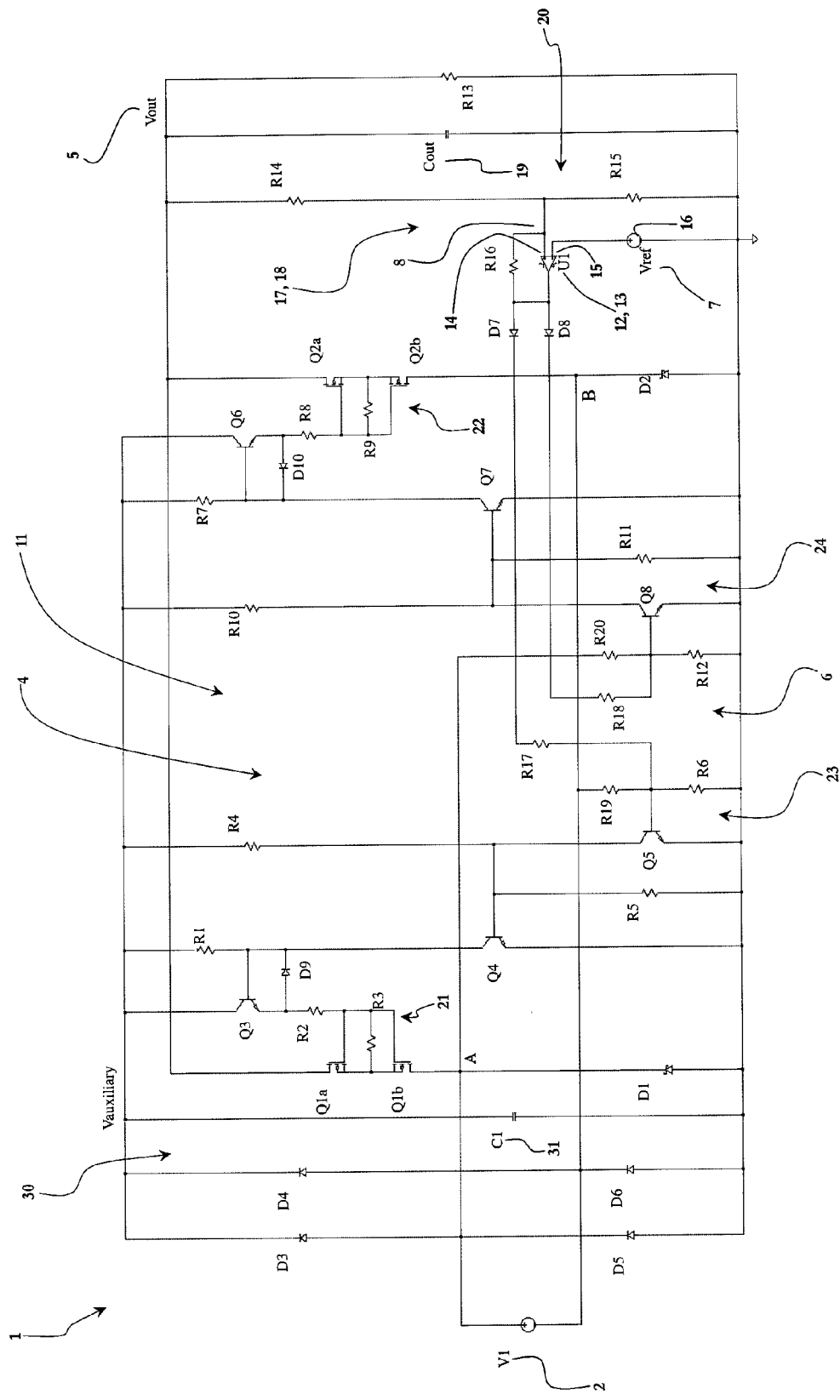
FIG. 13 is a schematic diagram showing the AC-DC converter of FIG. 12 in further detail.

FIG. 12 and FIG. 13 show a secondary AC-DC self-driven synchronous rectifier 4 with switches placed in the upper part of the rectifier. A full-bridge synchronous rectifier 4 consisting of two diodes D1 and D2 and two main switches 21 and 22 (also labeled as "Q1" and "Q2" respectively in FIGS. 12 and 13) is fed by the voltage of the AC input 2 (which could be the induced voltage in the secondary winding of a transformer) through an impedance network (which can be stray inductance of the secondary winding or an inductive-capacitive impedance). The main switches 21 (Q1) and 22 (Q2) at the upper part of the bridge are used to replace traditional diodes in a rectifier for the purpose of switching control. Each of Q1 and Q2 is formed by a pair of P-type MOSFETs connected in a back-to-back manner in order to form a bi-directional switch as shown in FIG. 12. When the common gate drive of each switch pair is deactivated (i.e the off-state of the bidirectional switch), one of the body diodes of the switch pair will always block the current flowing back from output load to input. The AC power flow to the output capacitor 19 ($C_{out}$) and the load R13 can be regulated to achieve a constant DC output 5 ($V_{out}$) within a tight tolerance. The power flow control method can adopt the hysteresis control similar to Embodiment 1. A feedback circuit 18 formed by R14 and R15 is used to sense and feed the output voltage information to the non-inverting input of a main comparator 13 (U1). The sensed feedback voltage signal 8 is then compared with a voltage reference 7 ($V_{ref}$) at the inverting input of the main comparator 13. The reference voltage 7 represents the desired output voltage level. When the feedback voltage signal 8 is higher than the reference voltage 7, the output of the main comparator 13 will go to high, and vice versa.

Unlike Embodiment 1 with three drivers, there are two drivers 23 and 24 (also labeled as "Driver 1" and "Driver 2" respectively in FIGS. 12 and 13) in this embodiment as shown in FIG. 12 and FIG. 13 because the output of the main comparator 13 (U1) is connected to the base drives of the two drivers 23 and 24 directly through resistors R17 and R18, respectively. An auxiliary low-power diode bridge 30 with an auxiliary capacitor 31 (C1) in FIG. 13 is used to provide the DC voltage for the two drivers 23 and 24. One driver 23, formed by Q3 to Q5, R3 to R6 and D9, is used to drive the main switch 21 (Q1) to turn ON or OFF according to the output voltage of the main comparator 13 (U1), and also to the switching voltage at point B. The other driver 24, formed by Q6 to Q8, R7 to R12 and D10, is used to drive the other main switch 22 (Q2) to turn ON or OFF according to the output voltage of the main comparator 13 (U1), and also to the switching voltage at point A.

The two modes of power flow disabling and power flow enabling are described further below.

Power Flow Disabling: The hysteresis control takes place when the output voltage 8 ($V_{out}$) is higher or lower than that of the reference voltage 7 ($V_{ref}$). When the feedback voltage 8 (representing the actual output voltage) is higher than the reference voltage 7 (representing the desired voltage), the main comparator 13 (U1) generates a high signal. This high voltage will turn on Q5 and Q8 through R17 and R18. Q5 and Q8 will in turn disable Q4 and Q7. The bases of Q3 and Q6 are tied (through R1 and R7 respectively) to the high voltage of an auxiliary power, which is developed from an auxiliary low power diode bridge circuit 30 with auxiliary capacitor 31 (C1) in FIG. 13. The base currents of Q3 and Q6 saturate them and turn them on. Therefore, the gates of Q1 and Q2 are in the high state. The switches Q1 and Q2 are in the off-state as they are P-type MOSFETs. Since both the main switches Q1 and Q2 are turned on when the output voltage is higher than the reference voltage 7, the output capacitor 19 ($C_{out}$) is cut off from the synchronous rectifier 4 and thus the power flow from the synchronous rectifier is disabled. During this power flow disabling period, the capacitor voltage will remain constant if there is no load discharging the output capacitor 19. If the output capacitor 19 is loaded, the output capacitor will be discharged by the load and so the output voltage 5 will decrease as shown in FIG. 8. This situation will continue until the output voltage 5 decreases to the lower hysteresis voltage band where the feedback voltage 8 becomes less than the reference voltage 7.

Power Flow Enabling: The input power can then be transferred to the output capacitor 19 again when the feedback voltage 8 is less than reference voltage 7. In this case, the output of the main comparator 13 (U1) becomes "low", meaning that the control of Q5 and Q8 is not influenced by U1 under this condition. Q5 is now controlled by the voltage at point B through resistor R19, while Q7 is controlled by the voltage at point A through resistor R20. The main comparator 13 (U1) will not influence the normal self-driven functions of the drivers 23 and 24 and so the main switches Q1 and Q2 will turn on and off according to the normal self-driven mechanism described previously. During this power flow enabling period, the input current will charge the output capacitor 19 and the output voltage 5 will increase until it reaches the upper hysteresis voltage band.

Since the hysteresis voltage band is small, the power flow disabling and enabling mechanism ensures that the output voltage 5 is regulated to the desired level within a tight tolerance. Since the power flow from the synchronous rectifier 4 is in form of a current source, the current source can be used to charge the output capacitor 19 directly without using an extra output filter inductor. For wireless charging system, this feature is acceptable because the voltage ripple in the output of the secondary module can be relatively large because there will be a battery charging control inside the battery pack for further control of battery charging, such as control of the initial constant current charging and the subsequent constant voltage charging.

Embodiment 3

Figure 14:
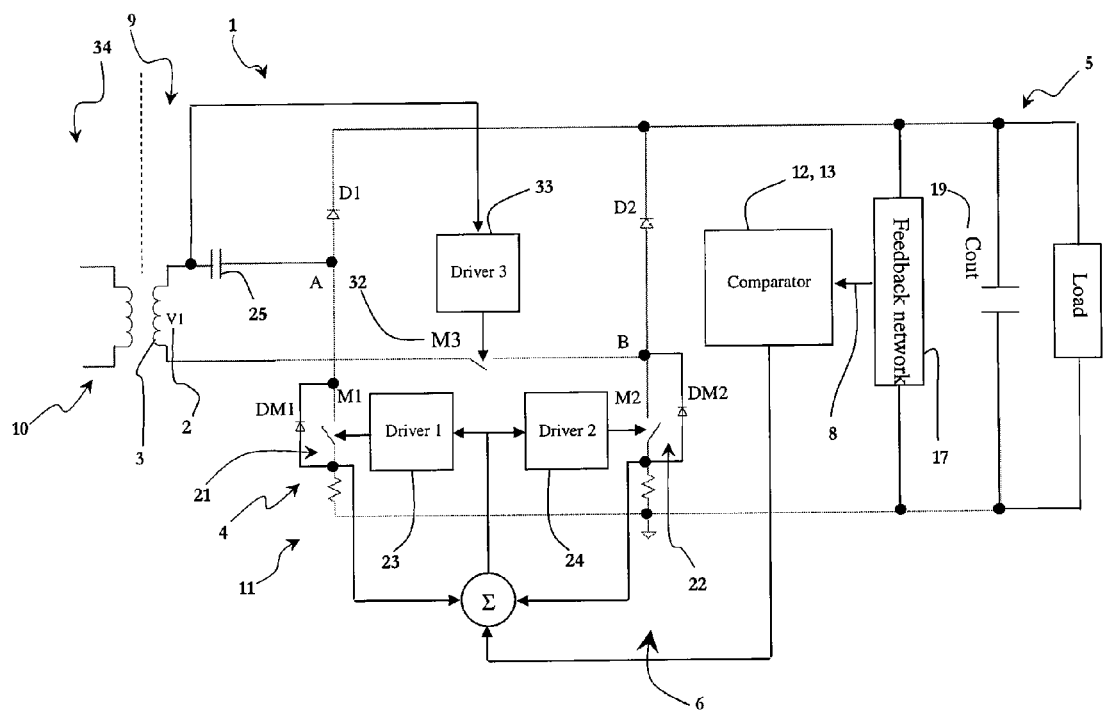
FIG. 14 is a schematic diagram of an AC-DC converter in accordance with a further embodiment of the present invention.
Figure 15:
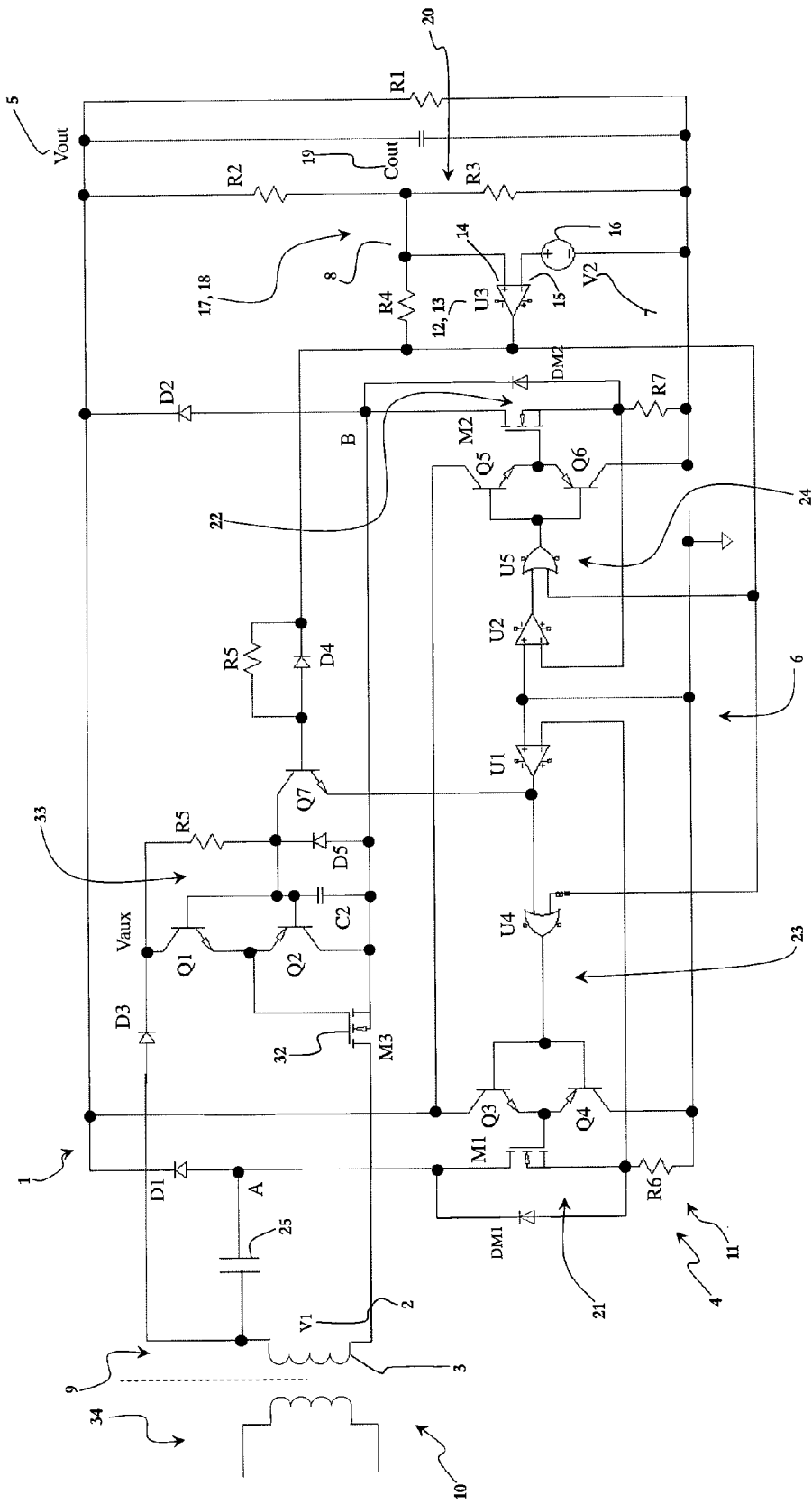
FIG. 15 is a schematic diagram showing the AC-DC converter of FIG. 14 in further detail.

FIG. 14 and FIG. 15 show another secondary AC-DC bridge-type rectifying circuit 4. Unlike Embodiments 1 and 2 in which the self-driven mechanism of the main switches 21 and 22 depend on the voltage at points A and B of the rectifier bridge, the main switches 21 and 22 in this approach use a "current-control" method. A synchronous rectifier bridge comprising two diodes D1 and D2 and the two main switches 21 and 22 (also labeled as "M1" and "M2" in FIGS. 14 and 15), which can be N-type MOSFETs, is fed by an AC input 2 having voltage V1 via a reactive impedance typically consisting of the stray impedance of the secondary winding 3 and a series input capacitor 25. M1 and M2 are intentionally used to replace two ordinary diodes at the lower portion of the bridge for the purpose of switching control and reduction of conduction loss. A tertiary switch 32 (also labeled as "M3" in FIGS. 14 and 15) is present in the return path of the AC input 2. The AC power delivered to the output load R8 with an output filtering capacitor 19 ($C_{out}$) can be regulated to achieve a constant DC output 5 ($V_{out}$).

The control method employs a hysteresis control mechanism. A feedback circuit 18, formed by R2 and R3, is used to sense the output voltage 5 and feed it into the non-inverting input of a main comparator 13 (U3) in FIG. 15. The sampled voltage 8 is then compared with a predefined voltage reference 7 (V2) at the inverting input of the main comparator 13 (U3). When the sampled voltage signal 8 is higher than the reference voltage 7, the output of the main comparator 13 (U3) will go to high. When the sampled voltage signal 8 is lower than the reference voltage 7, the output of the main comparator 13 (U3) will go to low. That means when the output voltage 5 is higher than desired value, the main comparator 13 goes to high too. When the output voltage 5 is lower than the desired value, the main comparator 13 goes to low.

There are three drivers in FIG. 14 and FIG. 15. One driver 23 (also labeled "Driver 1" in FIGS. 14 and 15), formed by U1, U4, Q3 and Q4, is used to drive M1 to switch ON or OFF according to the voltage sensed at the sensing resister R6. The sensing method can operate by sensing the voltage drop of the internal resistance of the switching MOSFET (M1). Another driver 24 (also labeled as "Driver 2" in FIGS. 14 and 15), formed by U2, U5, Q5 and Q6, is used to drive M2 to turn ON or OFF according to the voltage sensed at the sensing resister R7. Again, the sensing method can operate by sensing the voltage drop of the internal resistance of the switching MOSFET M2. M1 and M2 will be turned off when their currents are reversed (simulating the turn-off mechanism of the diode-reverse-recovery behavior of a diode). This can be realized with the help of driver comparators U1 and U2. When the current in either M1 or M2 flows in the negative sense in the sensing resistor (R6 for M1 and R7 for M2), the inverting input of the driver comparator (U1 for M1 and U2 for M2) is more positive than the voltage at the non-inverting input. The output of U1 or U2 will go low. This results in the turning off of M1 or M2. Otherwise, M1 and M2 are normally turned on for carrying any forward current.

The output of the main hysteretic comparator 13 (U3) feeds a driving signal to the inputs of the logical OR gates of U4 and U5, which are intentionally connected together at one of their inputs. Therefore, both sensing signals from the output feedback voltage 8 and current flowing through switching MOSFETs M1 and M2 will determine the ON time of the switching MOSFETs.

The two modes of power flow disabling and power flow enabling are described further below.

Power flow disabling: When the output feedback signal 8 is higher than the reference voltage 7, the output of the main comparator 13 (U3) goes high. Through U4 and U5, both M1 and M2 will be turned on simultaneously, resulting in points A and B being shorted together to form a closed current loop in the secondary winding 3 and its series impedance.

The longer the ON time, the less the power it will deliver to the output. A third driver 33 (also labeled as "Driver 3" in FIGS. 14 and 15), formed by Q1, Q2 and Q7, in the return path of the AC input 2, has the function of cutting off the current flow when the output of driver comparator U1 is low, as well as the output of the main comparator U3 is high. A high output of the main comparator U3 means that output voltage 8 is higher than the threshold voltage 7 (V2). Less power will be delivered to the load by increasing the ON times of both main MOSFETs M1 and M2. However, with a continuous current flow from input 2 (V1), M1 and M2 will create unnecessary energy loss. The tertiary switch 32 (M3), in the form of a switching MOSFET, can help to reduce the energy loss if it is in the OFF state, but must be OFF at the instant when the current flow of switching MOSFET M1 is in a reverse direction (zero current crossing)—driver comparator U1 is at low state. Q7 will then tie the switching MOSFET M3 to the OFF state. This will avoid any current transient when input current is flowing continuously to the output load. In the normal ON state, switching MOSFET M3 is driven by Q1 and Q2, both of which have an auxiliary supply from the input through D3. Resistor R5 biases Q1 and M3 connects the input and the load normally.

Power Flow Enabling: The input power can then be transferred to the output capacitor 19 again when the feedback voltage 8 is less than reference voltage 7. In this case, the output of the main comparator 13 (U3) becomes "low". The third driver 33 is self-biased in such a way that switch M3 is normally in a closed condition. In this condition, it will not influence the normal self-driven functions of the other two drivers 23 and 24 and so the main switches M1 and M2 will turn on and off according to the normal self-driven mechanism described previously. During this power flow enabling period, the input current will charge the output capacitor 19 and the output voltage 5 will increase until it reaches the upper hysteresis voltage band.

The present invention also provides in another aspect a method of converting an AC input provided by a power transfer winding. One broad embodiment of the method includes rectifying the AC input 2 into the rectified output 5, and controlling the rectification on the basis of a comparison between the reference signal 7 and the voltage feedback signal 8, the voltage feedback signal being based on the rectified output 5. It will be appreciated that the foregoing description also describes other embodiments of this method.

Advantageously, the present invention offers solutions to provide a "single-stage" AC-DC power converter:

(a) with output voltage regulation;
(b) with self-driven functionality for a synchronous rectifier on the secondary side of a transformer;
(c) without voltage control from the primary side of the transformer;
(d) without an extra DC-DC converter; and
(e) without an output inductor.

Based on a power flow enabling/disabling control signal, the power flow from the rectifying means of the AC-DC converter of the invention to an output capacitor is controlled in a way so that the output DC voltage is kept to a desired voltage level within a tight tolerance.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. An AC-DC converter for converting an AC input provided by a power transfer winding, the AC-DC converter including:
   a rectifying circuit configured to rectify the AC input into a rectified output, the rectifying circuit including a first main switch and a second main switch; and
   a control circuit configured to control the rectifying circuit based on a comparison between a reference signal and a voltage feedback signal, the voltage feedback signal being based on the rectified output, the control circuit including a first driver for driving the first main switch and a second driver for driving the second main switch, the first and second drivers disabling the rectified output when the voltage feedback signal is above the reference signal by a first value, and allowing the rectifying circuit to operate as a self-driven rectifier to enable the rectified output when the voltage feedback signal is below the reference signal by a second value.

2. An AC-DC converter according to claim 1 wherein the rectifying circuit includes a synchronous rectifier.

3. An AC-DC converter according to claim 1 wherein the rectifying circuit includes a self-driven synchronous rectifier.

4. An AC-DC converter according to claim 1 wherein the control circuit uses hysteresis control to control the rectifying circuit.

5. An AC-DC converter according to claim 1 including a comparing circuit for providing the comparison to the control circuit, the comparing circuit comparing the voltage feedback signal with a hysteresis tolerance defined by an upper hysteresis band above the reference signal and a lower hysteresis band below the reference signal.

6. An AC-DC converter according to claim 5 wherein the control circuit disables the rectified output when the voltage feedback signal exceeds the upper hysteresis band.

7. An AC-DC converter according to claim 5 wherein the control circuit enables the rectified output when the voltage feedback signal falls below the lower hysteresis band.

8. An AC-DC converter according to claim 1 including a main comparator for providing the comparison to the control circuit.

9. An AC-DC converter according to claim 8 wherein the main comparator has a non-inverting input and an inverting input, the voltage feedback signal being provided to the non-inverting input and the reference signal being provided to the inverting input.

10. An AC-DC converter according to claim 1 wherein the reference signal is a voltage across a zener diode.

11. An AC-DC converter according to claim 1 including a voltage feedback circuit for sampling the rectified output and providing the voltage feedback signal.

12. An AC-DC converter according to claim 11 wherein the voltage feedback circuit includes a voltage feedback circuit connected to the rectified output.

13. An AC-DC converter according to claim 12 wherein the voltage feedback circuit is connected across an output capacitor.

14. An AC-DC converter according to claim 12 wherein the voltage feedback circuit includes a resistive potential divider.

15. An AC-DC converter according to claim 1 wherein at least one main switch has low on-state resistance.

16. An AC-DC converter according to claim 1 wherein at least one main switch includes a pair of component switches connected back-to-back to form a bi-directional switch.

17. An AC-DC converter according to claim 1 wherein the rectifying circuit receives the AC input via a reactive impedance formed from a leakage inductance from the power transfer winding in series with an input capacitor, the AC-DC converter including an impedance capacitor connected across the reactive impedance with an impedance capacitor switch, wherein the impedance capacitor switch is turned on when the main switches are on thereby connecting the impedance capacitor across the reactive impedance.

18. An AC-DC converter according to claim 1 wherein the first and second drivers disable the rectified output by maintaining both the main switches on.

19. An AC-DC converter according to claim 18 wherein the main switches form part of a closed loop circuit when both the main switches are on, the current of the AC input circulating in the closed loop circuit thereby disabling the rectified output.

20. An AC-DC converter according to claim 1 wherein the first and second drivers allow the rectifying circuit to operate as a self-driven rectifier by allowing the main switches to turn on and off as part of a self-driven rectifier.

21. An AC-DC converter according to claim 1 wherein each of the first and second drivers includes two driver switches.

22. An AC-DC converter according to claim 1 wherein the control circuit includes a third driver for receiving the comparison between the reference signal and the voltage feedback signal, and for driving the first and second drivers based on the comparison.

23. An AC-DC converter according to claim 22 wherein the third driver includes two driver switches.

24. An AC-DC converter according to claim 22 wherein the first, second and third drivers drive the main switches through a summation point.

25. An AC-DC converter according to claim 1 wherein each of the first and second drivers includes three driver switches and a driver diode.

26. An AC-DC converter according to claim 1 wherein each of the first and second drivers directly receives the comparison between the reference signal and the voltage feedback signal.

27. An AC-DC converter according to claim 1 wherein the control circuit includes an auxiliary low-power diode bridge having an auxiliary capacitor to provide DC power to the first and second drivers.

28. An AC-DC converter according to claim 1 wherein each of the first and second drivers includes two driver switches and two driver comparing circuits.

29. An AC-DC converter according to claim 1 wherein the control circuit includes a return switch in the return path of the AC input such that turning off the return switch when the rectified output is disabled reduces energy loss from continuously circulating current.

30. An AC-DC converter according to claim 29 wherein the control circuit includes a third driver in the return path of the AC input, the third driver being self-biased such that the return switch is normally closed, and the third driver turning off the return switch when the rectified output is disabled thereby reducing energy loss from continuously circulating current.

31. An AC-DC converter according to claim 30 wherein the third driver includes three driver switches.

32. An AC-DC converter according to claim 1 forming part of a wireless power receiver that receives power wirelessly through the power transfer winding.

33. An AC-DC converter according to claim 32 wherein the wireless power receiver is a portable electronic device.

34. An AC-DC converter according to claim 1 wherein the power transfer winding is a transformer winding located on one side of a transformer and the control circuit is located on the same one side of the transformer.

35. An AC-DC converter according to claim 1 wherein the control circuit is conductively coupled to the rectifying circuit.

36. An AC-DC converter according to claim 1 wherein the AC-DC converter is a single-stage AC-DC converter.

37. A method of converting an AC input provided by a power transfer winding, the method including:
rectifying the AC input into a rectified output using two main switches; and
controlling the rectification on the basis of a comparison between a reference signal and a voltage feedback signal, the voltage feedback signal being based on the rectified output, wherein controlling the rectification includes driving one main switch with a first driver and driving the other main switch with a second driver, the first and second drivers disabling the rectified output when the voltage feedback signal is above the reference signal by a first value, and allowing the main switches to operate as part of a self-driven rectifier to enable the rectified output when the voltage feedback signal is below the reference signal by a second value.

38. A method according to claim 37 wherein a synchronous rectifier is used to rectify the AC input into the rectified output.

39. A method according to claim 37 wherein a self-driven synchronous rectifier is used to rectify the AC input into the rectified output.

40. A method according to claim 37 wherein hysteresis control is used to control the rectification.

41. A method according to claim 37 including comparing the voltage feedback signal with a hysteresis tolerance defined by an upper hysteresis band above the reference signal and a lower hysteresis band below the reference signal.

42. A method according to claim 41 wherein controlling the rectification includes disabling the rectified output when the voltage feedback signal exceeds the upper hysteresis band.

43. A method according to claim 41 wherein controlling the rectification includes enabling the rectified output when the voltage feedback signal falls below the lower hysteresis band.

44. A method according to claim 37 wherein a main comparator is used to compare the voltage feedback signal with the reference signal.

45. A method according to claim 44 wherein the main comparator is provided with a non-inverting input and an inverting input, and the method includes providing the voltage feedback signal to the non-inverting input and providing the reference signal to the inverting input.

46. A method according to claim 37 wherein a voltage across a zener diode is used to provide the reference signal.

47. A method according to claim 37 including sampling the rectified output to provide the voltage feedback signal.

48. A method according to claim 47 wherein a voltage feedback circuit connected to the rectified output is used to sample the rectified output.

49. A method according to claim 48 wherein the voltage feedback circuit is connected across an output capacitor.

50. A method according to claim 48 wherein the voltage feedback circuit is provided with a resistive potential divider.

51. A method according to claim 37 wherein at least one main switch is provided with low on-state resistance.

52. A method according to claim 37 wherein at least one main switch is provided with a pair of component switches connected back-to-back to form a bi-directional switch.

53. A method according to claim 37 wherein the AC input is provided via a reactive impedance formed from a leakage inductance from the power transfer winding in series with an input capacitor, the method including providing an impedance capacitor connected across the reactive impedance with an impedance capacitor switch, and turning on the impedance capacitor switch when the main switches are on thereby connecting the impedance capacitor across the reactive impedance.

54. A method according to claim 37 wherein the first and second drivers disable the rectified output by maintaining both the main switches on.

55. A method according to claim 54 wherein the main switches form part of a closed loop circuit when both the main switches are on, the current of the AC input circulating in the closed loop circuit thereby disabling the rectified output.

56. A method according to claim 37 wherein the first and second drivers allow the main switches to turn on and off to operate as part of a self-driven rectifier.

57. A method according to claim 37 wherein each of the first and second drivers is provided with two driver switches.

58. A method according to claim 37 wherein controlling the rectification includes receiving the comparison between the reference signal and the voltage feedback signal with a third driver, and driving the first and second drivers with the third driver based on the comparison.

59. A method according to claim 58 wherein the third driver is provided with two driver switches.

60. A method according to claim 58 wherein the first, second and third drivers drive the main switches through a summation point.

61. A method according to claim 37 wherein each of the first and second drivers is provided with three driver switches and a driver diode.

62. A method according to claim 37 wherein each of the first and second drivers directly receives the comparison between the reference signal and the voltage feedback signal.

63. A method according to claim 37 including providing an auxiliary low-power diode bridge having an auxiliary capacitor to provide DC power to the first and second drivers.

64. A method according to claim 37 wherein each of the first and second drivers is provided with two driver switches and two driver comparing circuits.

65. A method according to claim 37 wherein controlling the rectification includes providing a return switch in the return path of the AC input such that turning off the return switch when the rectified output is disabled reduces energy loss from continuously circulating current.

66. A method according to claim 65 wherein controlling the rectification includes providing a third driver in the return path of the AC input, the third driver being self-biased such that the return switch is normally closed, and the third driver turning off the return switch when the rectified output is disabled thereby reducing energy loss from continuously circulating current.

67. A method according to claim 66 wherein the third driver is provided with three driver switches.

68. A method according to claim 37 including receiving power wirelessly through the power transfer winding, wherein the power transfer winding is provided as part of a wireless power receiver.

69. A method according to claim 68 wherein the wireless power receiver is provided as a portable electronic device.

70. A method according to claim 37 wherein the power transfer winding is provided as a transformer winding located on one side of a transformer, and wherein the rectification is controlled with a control circuit located on the same one side of the transformer.

71. A method according to claim 37 wherein the AC input is rectified into the rectified output with a rectifying circuit and the rectification is controlled with a control circuit conductively coupled to the rectifying circuit.

72. A method according to claim 37 wherein the AC input is converted into the rectified output in a single stage.

* * * * *